May 9, 1961     H. J. BUTLER     2,983,337
DISC BRAKES
Filed Dec. 3, 1957     3 Sheets-Sheet 1
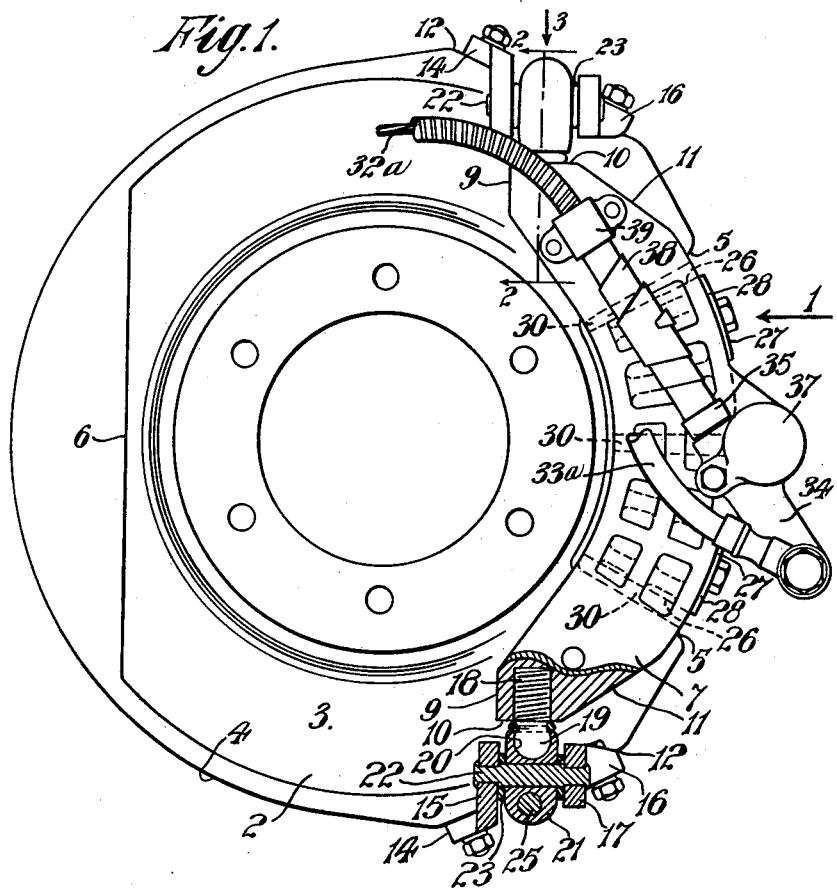
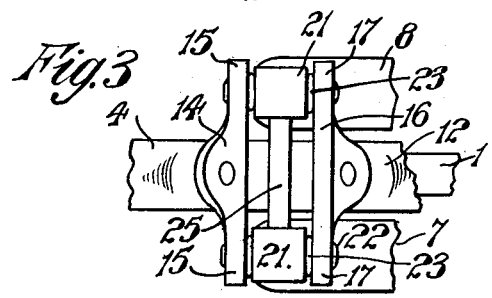
INVENTOR.
Henry James Butler
by Benj. T. Rauber
his attorney

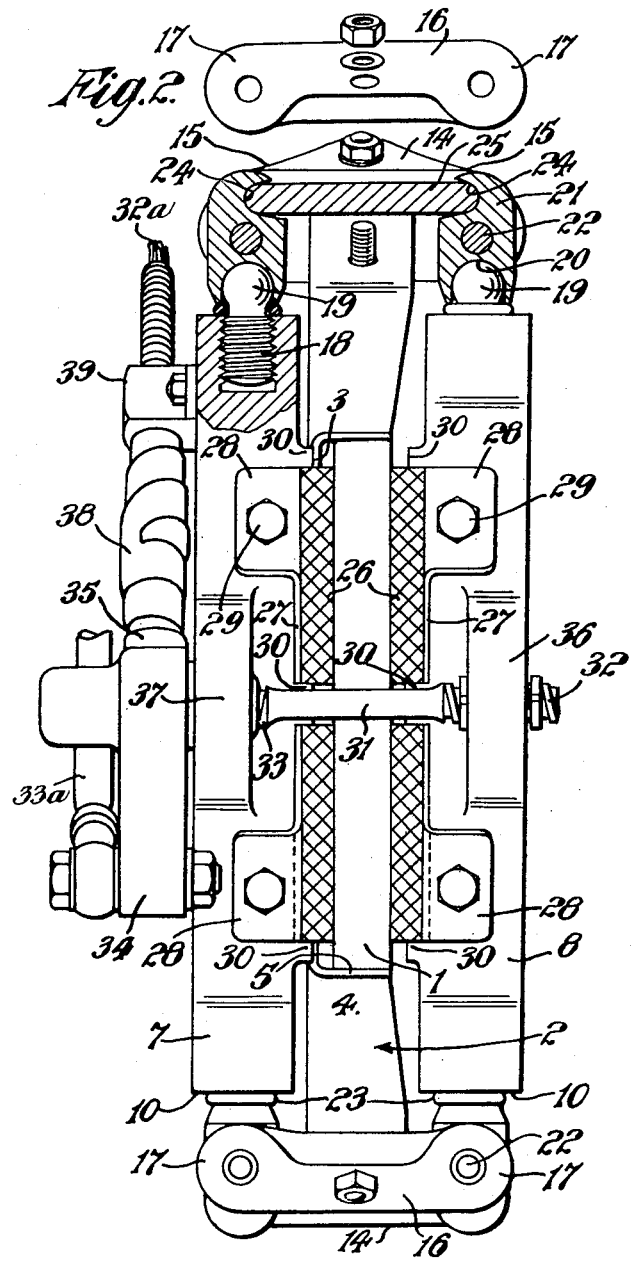

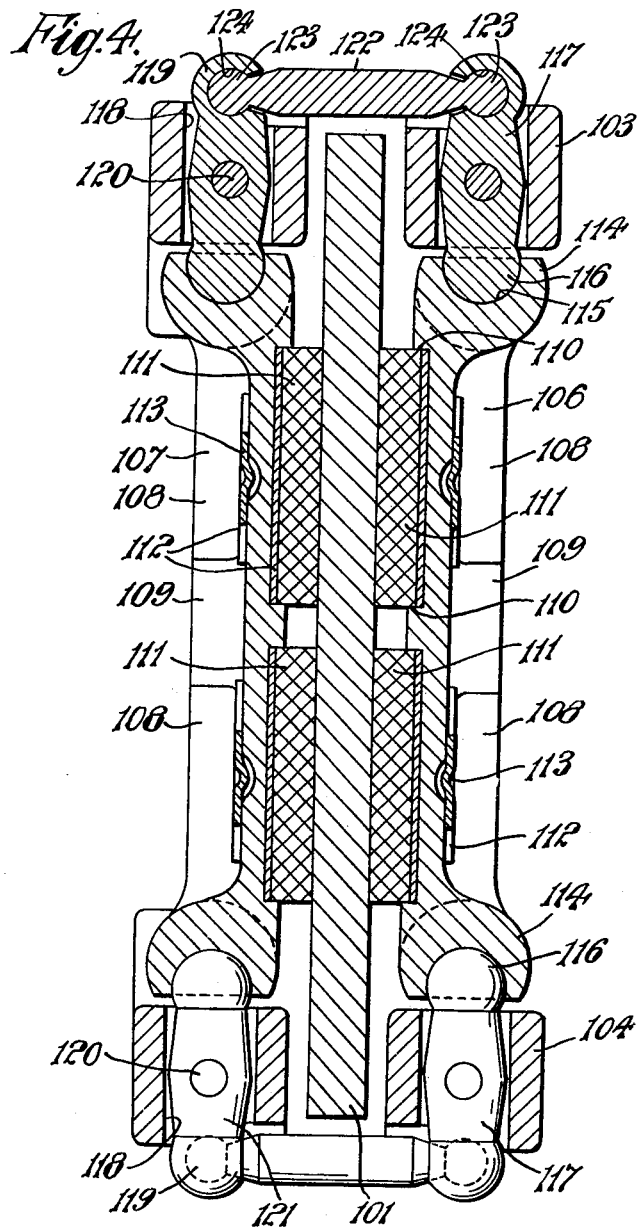

United States Patent Office 2,983,337
Patented May 9, 1961

2,983,337
DISC BRAKES

Henry James Butler, Sutton Coldfield, England, assignor to Dunlop Rubber Company Limited, London, England, a British company Filed Dec. 3, 1957, Ser. No. 700,356

Claims priority, application Great Britain Dec. 5, 1956

13 Claims. (Cl. 188—73)

This invention relates to disc brakes, and more particularly to disc brakes for motor vehicles and the like.

Disc brakes for motor vehicles and the like are known comprising a pair of pressure plates axially-aligned one on each side of a disc which is rotatable with a wheel or transmission shaft. The pressure plates are pivotally secured to a non-rotatable member, and have pads of friction material associated therewith to frictionally engage the adjacent braking faces of the disc. An operating mechanism, which may comprise a fluid-pressure operated piston and cylinder, or a cable operated by a hand-brake lever, is provided for pivotally moving both pressure plates inwardly towards the disc, thereby forcing the friction pads associated therewith into frictional engagement with the disc.

It has been found that when the disc is secured to the wheel end of an axle shaft, and to a lesser extent when it is secured to the shaft inboard of the wheel, it is liable to wobble or oscillate about its normally vertical plane. This is due to bowing or deflection of the axle when cornering the vehicle, or running it on a cambered road. The pressure plates, however, are constrained to pivot about an axis which is parallel to the normally vertical plane of rotation of the disc with the result that, when the brake is applied with the disc wobbling or oscillating, full frictional engagement between disc and pads is not effected and braking efficiency markedly deteriorates.

The object of the present invention is to provide a disc brake of the kind described wherein this objection is overcome.

According to the present invention a disc brake comprises a rotatable disc, a pivotable and non-rotatable pressure plate disposed adjacent a radial side of said disc, a pad of friction material associated with said pressure plate to frictionally engage the braking surfaces of the disc, and a mechanism to pivot said pressure plate inwardly towards said disc, said pressure plate being connected to a non-rotatable member through an articulated connection which enables said plate to tilt angularly relative to the normal plane of rotation of the disc to accommodate itself to wobbling or oscillation of said disc.

According to the invention also a disc brake comprises a rotatable disc, a pair of pivotable pressure plates axially-aligned one on each side of the disc, a fluid-pressure operated mechanism associated with said pressure plates to pivot them inwardly towards the disc, pads of friction material associated with said plates to frictionally engage the disc, a non-rotatable housing, and means to pivotally secure said pressure plates to said housing at points located at opposite ends of a chord passing through said disc, said means comprising an articulated connection which enables said pressure plates to tilt to accommodate themselves to wobbling or oscillation of said disc.

Preferably the pressure plates each have axially-aligned parts projecting beyond the periphery of said disc and the fluid-pressure operated mechanism is associated with said parts.

But a better understanding of the invention may be obtained from the following description when this is read with reference to the accompanying drawings, of which:

Figure 1 is a side elevation, partly, in section, of a brake according to the invention, Figure 2 is an end view of the arrow "1" of Figure 1, parts of the brake mechanism being shown in section along the line 2—2 of Figure 1, Figure 3 is a view of part of Figure 1 on the arrow "3" thereon, and Figure 4 is a view similar to Figure 2, of a slightly modified brake from which the brake-operating mechanism has been omitted.

In the embodiment of the invention shown in Figures 1 to 3, a vehicle disc brake comprises an annular disc 1 which is bolted at its inner periphery to the hub of a vehicle wheel which, in turn, is secured to one end of an axle shaft in the known manner. A cup-like housing 2 is secured to a non-rotatable portion of the vehicle, also in the known manner, and substantially encloses one side of the disc 1 with its annular radial base portion 3 and the periphery of the disc 1 with its axial portion 4. A portion 5 is cut out of its base and axial portions on one side thereof, this portion 5 being substantially in the shape of a sector of a ring, (i.e., a "ring sector") on the base, or radial, portion 3 and being rectangular in shape in the axial portion 4. An incision 6 is made chordally across the radial side 3 of the housing diametrically-opposite the base of the cut-out sector 5, and the radial surface 3, radially outwards of the incision 6, is depressed axially-inwardly to cause a slight axial separation of the two sides of the incision 6 to form an air vent therebetween. This vent comprises an air, or ventilation, inlet to the interior of the housing 2 and when the assembly is mounted on a vehicle the air inlet is disposed to face the front thereof so that in the forward movement of the vehicle cooling air is scooped into the inlet and passes around the rotating disc. The housing 1 acts as a protecting shield for the disc and brake parts on the side thereof not covered by the web or body of the wheel and prevents these parts from damage by flying stones, dirt, mud and the like.

Two pressure plates 7, 8 are located one on each side of the disc 1, symmetrically of the sector 5 and extending circumferentially on each side thereof. The pressure plates 7, 8 are each substantially in the shape of a segment of a ring with their chordal ends 9 disposed parallel to the incision 6 and on the opposite radial side of the centre of the disc 1. These ends 9 lie vertically when the brake is in position on the vehicle.

The outer periphery of each pressure plate 7, 8 is truncated at the point of its merger with the ends 9 at each end thereof, this truncation forming an end portion 10 at right angles to each end 9. The end portions 10 on each pressure plate 7, 8 lie parallel to each other and merge gradually with the outer periphery of the pressure plates through an intervening angularly-disposed surface 11.

Secured to flattened portions 12 of the axial wall 4 of the housing 2, on each circumferential side of the sector 5 and having its major surface lying substantially on the same chord as the ends 9 of the pressure plates 7, 8, is a bracket 14, which lies transversely of the wall 4 and has a portion 15 extending axially-outwardly of the housing 2 on each side thereof and chordally-inwardly towards and parallel with the adjacent ends 9 of the pressure plates 7, 8 as shown more clearly in Figures 2 and 3.

Circumferentially-spaced from each bracket 14 in the direction of the sector 5 a similar bracket 16 is also secured to each flattened portion 12, the bracket 16 similarly lying transversely of the housing 2 and having end portions 17 similar to the portions 15 and lying in parallel spaced relation thereto.

A knuckle-bolt 18, having a part-spherical head 19 at the outer end thereof, is screwed into the surface 10 at each end of each pressure plate 7, 8 and is engaged in a complementary recess 20 in a universal pivot block 21 which is pivoted for movement in a plane normal to the disc 1 on a pin 22 secured in the respective portions 15 and 17 of the brackets 14 and 16 in co-axial holes formed therein. Resilient washers 23 are located between the block 21 and the adjacent surfaces of the members 15, 17 and the pressure plates 7 and 8.

At the end of each block 21 remote from the recess 20, and on the radially-outer side of the pin 22, is formed a recess 24, the recesses facing axially-inwardly of the housing 2, i.e., towards each other, and between each co-operating pair of blocks 21 a link pin 25 has its opposite ends engaged one in each of the co-operating recesses 24. The outer ends of the blocks 21 are thus held against approaching each other any closer than the pins 25 will permit.

As shown in Figure 3 the blocks 21 are of square shape in plan and are rectangular in elevation, with dome-like ends.

The pads 26 of friction material are of ring-sector shape in plan and in elevation are slightly wedge-shaped, or tapered, towards their inner peripheral edge for a reason which will become apparent hereunder. Two adjacent pads 26 are disposed on each side of the disc 1 and these are secured to the radial face of backing plates 27, which are of substantially the same shape and size as the pads 26 and have axially-out-turned lugs 28 at one end of their outer arcuate surfaces. The backing plates 27, with the friction pads 26 attached thereto, are inserted between the disc 1 and the respective pressure plates 7 and 8 so that the pads 26 lie adjacent the opposite radial surfaces of the disc 1, and are then secured to the respective pressure plate 7 or 8 by means of bolts 29 passed through holes in the lugs 28 and screwed into the outer arcuate edge of the associated pressure plate; this means of securing the friction pads 26 being such that they may be withdrawn for inspection or renewal without it being necessary to dismantle the brake. The pads 26 and plates 27 are held against movement by rotation of the disc 1 when they are engaged therewith by webs 30 formed on the inner surface of the pressure plates 7 and 8 to define between respective pairs a recess in which the respective backing plate 27 and a portion of a pad 26 are located.

The operating mechanism for the brakes comprises a quick-action screw mechanism with which may be associated an automatic adjusting device. This mechanism may, as shown in Figure 2, comprise a mechanism such as is more specifically defined in the specification of our co-pending British patent application No. 777/56.

As applied to the present brake, this mechanism comprises an operating rod 31 having a right-hand coarse-pitched square thread 32 at one end thereof and a similar thread 33 formed in the opposite, or left-hand, sense adjacent the other end thereof. The end of the rod 31 remote from the thread 32 and axially-outwards of the thread 33 is provided with means whereby the rod 31 may be rotated by actuation of a mechanically-operated cable 32a, or by fluid-pressure admitted through a conduit 33a into a cylinder 34, whereby linear movement of a plunger 35 in said cylinder 34 is adapted to be transformed into rotary motion of the operating rod 31. Such an operating mechanism forms the subject-matter of our co-pending British patent specification No. 777/56 and as other means for applying the brake will be obvious to those skilled in the art, and as the brake-actuating means per se form no part of the present invention a more detailed description thereof is considered to be superfluous to the full disclosure of the present invention.

According to Figure 2, the thread 32 on the rod 31 is engaged with a co-operating thread formed axially through a boss 36 on a radial projection of the pressure plate 8 and the thread 33 is engaged with a similar thread formed axially through a boss 37 on a similar projection of the pressure plate 7.

In the operation of the brake, admission of fluid-pressure to the cylinder 34, or alternative operation of the cable 32a, will cause the plunger 35 or the like to be moved in the cylinder 34 in such a manner as to cause rotation of the rod 31 in a sense which will cause the threads 32 and 33 to turn further into the threads in the bosses 36 and 37 and so draw the pressure plates 7 and 8 together, pressing the friction pads 26 firmly against the adjacent sides of the disc 1 and applying the brake. A double volute spring 38 is located in compression between the end of the plunger 35 and the block 39 secured to the pressure plate 7, and upon release of the cable 32, or of the fluid-pressure in the cylinder 34, the spring 38 forces the plunger 35 back in the cylinder 34 to cause counter-rotation of the rod 31, which thus moves the pressure plates 7 and 8 away from the disc 1 and so causes retraction of the friction pads 26.

Pivoting of the pressure plates 7, 8 about the axis defined by the knuckles 19 at each end thereof would be sufficient to apply the brakes if there was no wobbling or oscillation of the disc 1. In the operation of a vehicle, however, there is always a certain amount of bending or flexure of the axle, and in particular of the rear axle, so that the disc does not normally rotate in a true plane but is subject to vibration, oscillation and wobbling which produce a "swash-plate" effect which make it desirable to provide the pressure-plates with a substantially-universal pivotal action so that the pressure plates and associated pads will remain squarely presented to the disc regardless of its attitude.

Thus in the present invention, besides the plates 7, 8 being free to pivot on the knuckles 19 about the chord of the disc 1 the knuckles 19 are also free to move through a plane at right angles to their own axes. If, for instance, the upper portion of the disc 1 wobbles or oscillates to the left in the upper portion of Figure 2, the pressure plates 7 and 8 will move with the disc by pivotal movement of the blocks 21 about the pins 22, the link pin 25 engaged between the outer ends of the blocks 21 ensuring that as the pressure plate 7 is moved to the left, pivoting the left hand block 21 in a clockwise direction, this movement will be transmitted to the right-hand block 21 to force the pressure-plate 8 over towards the disc. Thus, "hammering" on the friction pads due to oscillation of the disc is prevented and they maintain a continuously square and substantially unaffected presentation to the disc regardless of operational aberrations.

The friction pads 26 and associated backing plates 27 may be removed for renewal or replacement without dismantling any other portion of the brake merely by removing the bolts 29 and withdrawing the pads 26 and backing plates 27 radially of the disc.

As the vehicle moves forwards, air enters the housing through the duct 6 and passes around the disc 1 and friction pads 26 before leaving through the space 5 adjacent the friction pads 26. The housing 2, located on the outside of the disc, i.e., the side thereof remote from the wheel, also assists to protect the disc from damage by flying stones and the like.

The brake illustrated in Figure 4 is substantially the same as that previously described in relation to Figures 1 to 3 with the exception of certain modifications to be described hereunder.

The disc 101 is secured to a rotatable part of a vehicle such as a wheel or axle thereof. A housing is secured to a fixed part of the vehicle and comprises two circumferentially-spaced caliper portions 103, 104, each of which straddles the outer periphery of the disc 101.

A pressure plate 106, 107 is located between the caliper parts 103, 104 on each side of the disc 101. Each pressure plate 106, 107 is aligned with one of the braking faces of the disc 101 and on the face of each plate remote from the disc there is provided a pair of reinforcing ribs 108 joined together to form a V, the apex 109 of which projects beyond the outer periphery of the disc midway between the caliper portions 103, 104. The other face of each plate 106, 107, i.e. the face adjacent the disc 101, is recessed as at 110 to provide seatings for a pair of ring sector-shaped friction pads 111 each of which is provided with a metal backing plate 112 having an integral spring clip 113, the arrangement being that the pads 111 are located in said recesses 110 and are releasably clipped on to the pressure plates 106, 107 so that they can be readily removed and replaced.

The ends of the reinforcing ribs 108 of each plate remote from the apex 109 are formed as bosses 114. Each boss 114 is formed with a part-spherical recess 115 to receive the part-spherical head 116 of a pivot-member 117 projecting from the caliper-ends 103, 104, whereby the plates 106, 107 are pivotable towards or away from the disc 101. The pivot-members 117, of which there are four in all, two on each side of the disc, are located in passages 118 in the caliper-members 103, 104 which are co-axial with the pivotal axis of said pressure plates 106, 107. Each pivot-member 117 comprises a part-spherical head 116 projecting from one end of its associated passage 118, this head 116 being located in a part-spherical recess 115 in a plate 106 or 107, as above described, and a similar part-spherical head 119 projecting from the other end of said passage 118. The part of the pivot-member 117 located wholly within the passage 118 is substantially barrel-shaped, i.e., cylindrical but formed with a double taper, the largest diameter portion 121 being central thereof. A pin 120 extends radially across said passage 118 and through said larger diameter portion 121 in a plane parallel to the disc 101, thereby constraining the pivot-member 117 to move angularly only in a plane normal to that of the disc. The free ends of each pair of pivot-members 117, one on each side of the disc 101, are connected by a link 122 which extends axially adjacent the periphery of the disc 101 and has two part-spherical ends 123 which are located in complementary seatings 124 in the free ends of said pivot members 117.

The total effect of this arrangement is that not only can the pressure plates 106, 107 pivot inwardly towards the disc 101 to apply the brake in the normal way but, due to the articulated construction described, they can also tilt, as from one circumferentially spaced end to the other, and thereby accommodate themselves to wobbling or oscillation of the disc, due to bowing of the axle, up to the limits determined by the angular movement of the pivot-member 117 about its locating pin 120.

Braking may be effected either mechanically or by a fluid-pressure operated mechanism. For example, the pressure plates may be moved towards the disc by a lever and cable assembly, as in a hand-brake. Alternatively a fluid-pressure operated piston and cylinder mechanism may be associated with the projecting part 109 of one pressure plate and an operating rod be extended therefrom adjacent the outer periphery of the disc 101 and be connected to the projecting part of the other pressure plate so that, on operation of the mechanism, the plates are forced inwardly towards the disc. A further alternative operating mechanism comprises a means for converting linear movement of a brake-operating device to rotary motion of brake-applying means, and this may comprise a mechanism secured to, say, the pressure plate 106 and being operable alternatively by a fluid-pressure operated plunger or by a cable to rotate an operating rod in the manner more fully described hereabove in relation to Figures 1 to 3 of the drawings.

The brake operates exactly as does that of Figures 1 to 3, the links 122 being operable to ensure that the pressure plates 106, 107 pivot together in the same direction.

The friction pads 111 and backing plates 112 are removable from the housing 102 by overcoming the springy connection 113 and sliding them radially-outwardly, there being no need to interfere with the rest of the brake.

The brake-operating mechanism is not shown in Figure 4 as this is considered to be unnecessary in view of the disclosure thereof in Figures 1 to 2 and the further fact that the brake operating means per se form no part of the present invention; the operating rod 31 and associated features forming the subject-matter of our prior British patent specification No. 777/56, and the motion-converting mechanism forming the subject-matter of our co-pending British patent specification No. 777/56.

Having now described my invention—what I claim is:

1. A disc brake comprising a rotatable disc, a pair of pivotable pressure plates axially-aligned one on each side of the disc, a mechanism associated with said pressure plates and operable to pivot them inwardly towards the disc, pads of friction material associated with said plates to frictionally engage the disc, a non-rotatable housing, and means to pivotally secure said pressure plates to said housing at points located at opposite ends of a chord passing through said disc, each said means comprising a pivot block pivoted centrally to said non-rotatable housing, a ball and socket connection between each said plate and one end of said pivot block and a link connecting the other ends of aligned pivot blocks on opposite sides of said disc.

2. A disc brake according to claim 1 wherein said pressure plates comprise axially-aligned portions extending beyond the periphery of said disc and said mechanism is associated with said extending portions.

3. A disc brake comprising a rotatable disc, a non-rotatable part of a brake assembly, a pair of axially aligned, angularly movable, pressure plates, one on each side of the disc, pivotal connections one for each of two ends of said plates pivotally connecting said ends to said non-rotatable part of the brake assembly, a pad of friction material associated with each pressure plate to frictionally engage a braking surface of the disc, and a mechanism to effect said frictional engagement, each of said pivotal connections comprising a pair of pivot blocks pivoted centrally to said non-rotatable part of the brake assembly, a ball and socket connection between said plates and one end of each of said pivot blocks and a link connecting the other end of the pivot block at one side of said disc to the axially opposite end of the pivot block on the opposite side of the brake disc.

4. The disc brake of claim 3 in which said ball and socket connection comprises a part-spherical part on said pressure plate and a part-spherical socket on said pivot block receiving said part-spherical part on said pressure plate.

5. The disc brake of claim 3 in which said ball and socket connection comprises a part-spherical part on said pivot block and a part-spherical socket on said pressure plate receiving said part-spherical part of said pressure block.

6. A disc brake according to claim 3 wherein said articulated connection comprises a pair of knuckle bolts secured one at each end of said pressure plate and having a part-spherical head protruding therefrom, said part-spherical head lying on an extension of a chord of said disc, a pair of pivot blocks one for each of said part-spherical heads having a part-spherical recess at one end thereof to receive one of said part-spherical heads, each said pivot block being pivoted about a pivot pin passed transversely therethrough at right angles to the said extension of said chord, fixed brackets mounting said pivot pins and a link pin extending axially of said brake disc at right angles to said pivot pins, said link pin being secured at its ends in aligned pivot blocks on opposite sides of said brake disc.

7. A disc brake according to claim 3 wherein each said pad of friction material is secured to a backing plate having means whereby it is detachably secured to a pressure plate, and means whereby said friction pad and backing plate may be removed from said brake without dismantling thereof.

8. A disc brake according to claim 7 wherein said means detachably to secure said backing plate to said pressure plate comprises a flange on said backing plate and a bolt securing said flange to said pressure plate.

9. A disc brake according to claim 7 wherein said means detachably to secure said backing plate to said pressure plate comprises a spring clip formed on said backing plate, said spring clip being engageable with a portion of the surface of said pressure plate remote from said disc.

10. A disc brake according to claim 3 wherein said non-rotatable member comprises a cup-like housing secured to a non-rotatable portion of a device to be braked, said cup-like housing being adapted substantially to enclose one radial side of said disc and the major portion of its periphery and having an aperture therein through which a pressure plate is adapted to pivot.

11. A disc brake according to claim 10 wherein said housing comprises an aperture formed therein on a chord parallel to the chord of said pressure plate, said aperture comprising a duct to admit air to the interior of said housing.

12. A disc brake according to claim 3 wherein said non-rotatable member comprises a pair of caliper portions each having a portion extending adjacent opposite radial faces of said disc, and said articulated connection has a portion thereof pivoted in each of said caliper portion.

13. A disc brake according to claim 3 wherein said pressure plates extend beyond the periphery of said disc in the form of a boss, a recess in each said boss, an operating rod having a screw thread formed at each end thereof engaging with a mating thread in each said recess, said threads being formed respectively in a left and right hand sense, and means to rotate said operating rod whereby said pressure plates are adapted to be drawn together towards said disc or to be forced apart away from said disc.

References Cited in the file of this patent

UNITED STATES PATENTS

| 1,711,602 | Kindler | May 7, 1929 |
| 1,959,049 | Buus | May 15, 1934 |
| 2,689,024 | Trevaskis | Sept. 14, 1954 |

FOREIGN PATENTS

| 1,083,050 | France | Jan. 4, 1955 |
| 925,269 | Germany | Mar. 17, 1955 |
| 712,534 | Great Britain | Mar. 6, 1952 |
| 734,856 | Great Britain | Aug. 10, 1955 |
| 310,320 | Italy | Aug. 9, 1933 |